INVENTORS
Charles W. Skelton and
William F. Donnell
BY Stevens, Davis, Miller & Mosher
ATTORNEYS Aug. 11, 1959

C. W. SKELTON ET AL 2,899,572

THREE PHASE POWER SUPPLY

Filed April 4, 1957

INVENTORS
*Charles W. Skelton* and
*William F. Donnell*

BY *Stevens, Davis, Miller & Mosher*

ATTORNEYS

Aug. 11, 1959

C. W. SKELTON ET AL 2,899,572

THREE PHASE POWER SUPPLY

Filed April 4, 1957

INVENTORS
Charles W. Skelton and
William F. Donnell

BY Stevens, Davis, Miller & Mosher

ATTORNEYS

United States Patent Office

2,899,572
Patented Aug. 11, 1959

2,899,572

THREE PHASE POWER SUPPLY

Charles W. Skelton, Irving, and William F. Donnell, Richardson, Tex., assignors to Texas Instruments Incorporated, Dallas, Tex., a corporation of Delaware Application April 4, 1957, Serial No. 650,786

16 Claims. (Cl. 307—106)

This invention relates to a phase splitter power supply designed to produce a three phase accurately divided A.C. output from a D.C. source. The power supply is further designed to be light weight so that it can advantageously be used on aircraft.

Prior to this invention, three phase systems of power supply usually were generated from A.C. by using passive components. The use of passive components, however, result in considerable variation in the phase displacement, whereas in the digital phase splitter of the present invention there is essentially zero error in the phase displacement. This advantage is particularly important when the three phase supply is used to energize self synchronous repeaters or synchros and the like. The present invention discloses a three phase power supply in which the three phases are precisely displaced 120° from each other in phase. The precision is obtained by using flip-flop frequency dividers to produce the phase division. Also, prior to this invention, a two phase power supply has been obtained by using a flip-flop frequency divider system; however, a two phase system has a limited utility and has little practical application, whereas the three phase power supply of the present invention is widely used. The power supply of the present invention is made light weight by using transistor components for the active components of the system.

In general according to the invention, a crystal oscillator generates a high frequency which is fed to a pulse former circuit which produces a square wave form at the same frequency as produced by the oscillator. The square wave output from the pulse former is differentiated and then fed to frequency divider circuitry which generates the three phases.

According to one form of the invention, the oscillator generates a frequency of 4800 cycles per second. The output from the pulse former is fed to both a ternary divider which produces an output frequency of 1600 cycles per second and to a binary counter which produces 2400 cycles per second. The binary counters used in this system act as frequency dividers. They produce an output frequency at one half their input frequency. The output from the ternary divider is fed in turn to a second binary counter which produces 800 cycles per second. The outputs from the first and second binary counters are then fed to three output binary counters in various combinations of triggering and gating control circuits. The three output binary counters each produce 400 cycles which are 120° displaced in phase from each other. This output constitutes a three phase 400 cycles per second power supply.

According to a second form of the invention, the output from the pulse former is fed into a chain of three flip-flops which gates itself to produce the three phase balanced 400 cycle per second power supply. Each succeeding flip-flop circuit gates the preceding one and produces an output voltage at one-sixth the frequency applied from the pulse former. In this form of the invention, the oscillator produces 2400 cycles per second instead of 4800 cycles per second so that when divided by six it produces the 400 cycles per second power supply.

The objects and the advantages of this invention can be better understood from the description with reference to the following figures.

Figure 1:
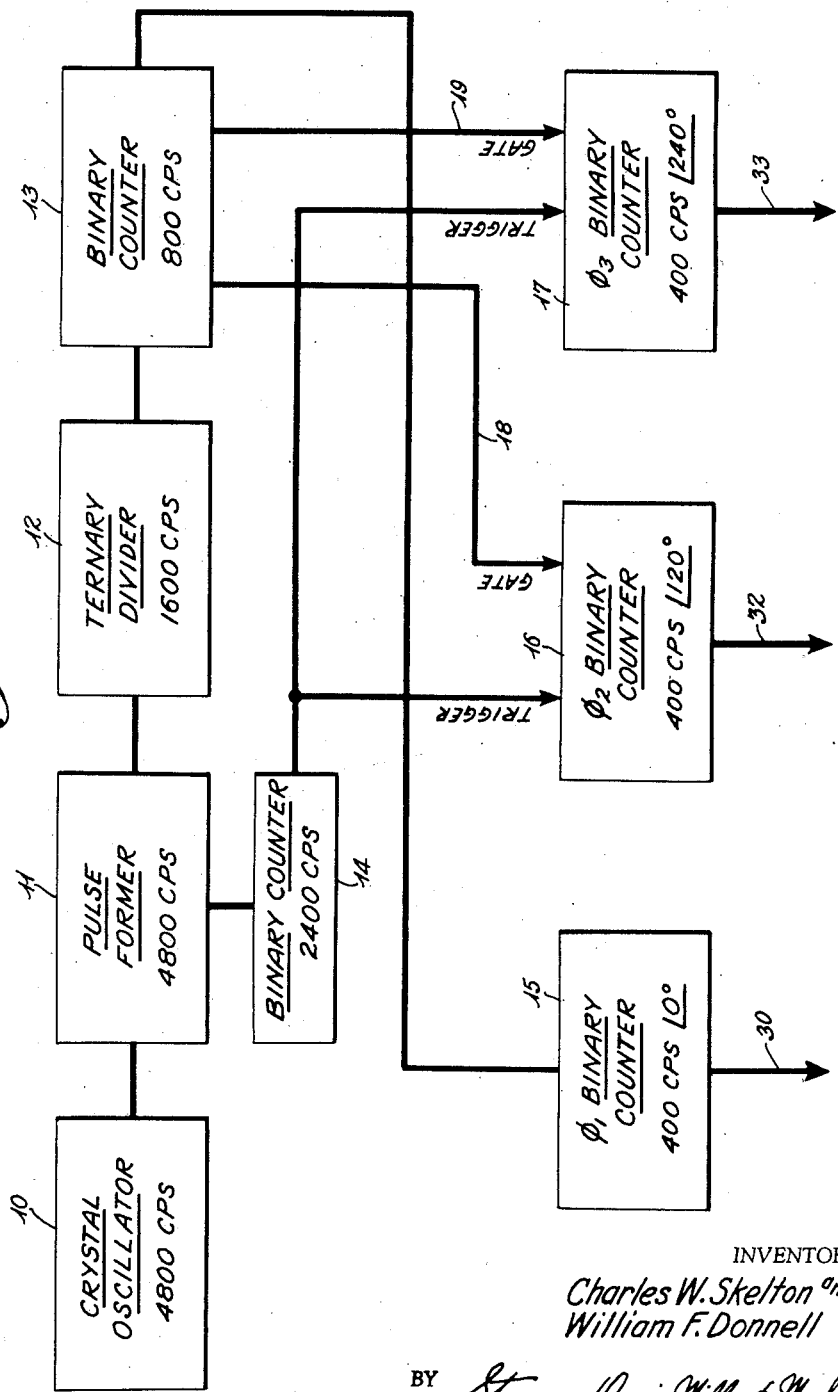
Figure 1 shows a block diagram of the system for one form of the invention.

Referring now to Figure 1 in which the block diagram of one form of the invention is shown, a crystal oscillator 10 generates a frequency of 4800 cycles per second. The output from the crystal oscillator is fed into the pulse former 11 which converts the signal produced by the oscillator 10 into a square wave. The square wave signal produced by the pulse former 11 is differentiated and fed to the ternary divider 12 which divides the frequency down to 1600 cycles per second.

The system according to this form of the invention makes use of two intermediate binary counters 13 and 14, and three output binary counters 15, 16 and 17. Each of these binary counters comprise a flip-flop circuit which changes its state upon the receipt of a triggering pulse and thereby produces an output frequency at one-half the input frequency. The 1600 cycles per second output produced by the ternary divider is fed to the binary counter 13. The output from the pulse former 11 is also fed to the binary counter 14 which divides the input frequency by two and produces an output signal of 2400 cycles per second. The binary counter 13 divides its input frequency by two and produces an output signal of 800 cycles per second. One output signal from the binary counter 13 is applied to the output binary counter 15 which divides the applied frequency by two and produces an output signal at 400 cycles per second which constitutes one of the three phases of the three phase power supply. The other two output binary counters 16 and 17 are fed by the 2400 cycles per second signal produced by the binary counter 14. The binary counters 16 and 17 are furthermore gated by opposite sides of the flip-flop of the binary counter 13 so that only one in every three cycles produced by the binary counter 14 actuates the output binary counters 16 and 17. Accordingly, the binary counters 16 and 17 each generate an output frequency of 400 cycles per second (since one in every three actuates the binary counters, the effective input frequency to the counters 16 and 17 is ⅓ of 2400 or 800 cycles per second; since the binary counters produce an output frequency at one-half their input frequencies they produce ½ of 800 cycles per second or 400 cycles per second). The gating signals from the binary counter 13 are applied to the binary counters 16 and 17 over the lines 18 and 19. The signals are taken from the opposite sides of the flip-flop of binary counter 13 so that when the signal on lead 19 enables the binary counter 17, the signal on lead 18 disenables the binary counter 16. When the binary counter 13 changes state, this condition is reversed and the signal on lead 18 enables the binary counter 16 to be triggered by the signal from the binary counter 14 while the signal on lead 19 disenables the binary counter 17. The signals on leads 18 and 19 switch back and forth at a rate of 800 cycles per second. This gating operation results in the binary counter 16 producing its 400 cycle output delay 120° in phase from the output of the binary counter 15; likewise, the binary counter 17 produces its output of 400 cycles per second delayed 240° in phase from the output of the binary counter 15. The outputs from the three binary counters 15, 16 and 17 are then each displaced from the other two 120° in phase. The operation of the system of Figure 1 can be better understood with reference to Figure 4 which shows various wave forms produced by the system. The pulse former 11 produces a square wave form 11a. This square wave form is differentiated to produce a wave form 11b which is applied to the ternary divider 12 and the binary counter 14. The ternary divider 12 and the binary counter 14 are only actuated by the negative going pulses 20 of the wave form 11b. The negative going pulses are used rather than the positive going pulses throughout the system because they have a better rise time and hence are more precise than the positive going pulses. The binary counter 14 is actuated each time it receives one of the negative spikes 20 of the wave form 11b and thereby produces the wave form 14a which is generated by the changing of the state of the flip-flop of the binary counter 14. This wave form 14a is at one half the frequency of the wave form 11a. The waveform 14a is differentiated to produce the wave form 14b which is applied to the binary counters 16 and 17. The ternary counter 12 is actuated by the negative going pulses 20 of the wave form 11b and produces a wave form 12a. The details of how the wave form 12a is generated will be better understood as described below with reference to Figure 2 which shows the circuitry of the system. The waveform 12a is differentiated to produce the wave form 12b, which is applied to the binary counter 13. The binary counter 13 is actuated by the negative going pulses 21 of the wave form 12b and thereby produces the wave forms 13a, which is applied to the lead 18, and 13b, which is applied to the lead 19. The wave form 13a is also differentiated to produce the wave form 13c which is applied to the binary counter 15. The binary counter 15 is actuated by the negative pulses 22 of the wave form 13c and thereby produces a wave form 15a, which is applied to the output lead 30 and is one of the three output wave forms which constitute the three phase power supply.

The binary counter 16 is actuated by the negative going pulses of the wave form 14b when it is enabled by the wave form 13a on lead 18. The binary counter 16 is enabled by this wave form whenever the wave form is in its low voltage state. When the first negative triggering pulse 41 of the wave form 14b is applied to the binary counter 16, wave form 13a is in its low voltage state and therefore the counter 16 is enabled and it accordingly changes state. When the next triggering pulse 42 is applied to the binary counter 16, the wave form 13a is in a high voltage state and the binary counter 16 is disenabled and accordingly does not change its state. When the succeeding negative triggering pulse 43 of the wave form 14b is applied to the binary counter 16, the wave form 13a is still in its high voltage state and accordingly the binary counter 16 is still disenabled and the binary counter 16 does not change its state. However, on the next negative pulse 44 of the wave form 14b, the wave form 13a is again in its low voltage state and accordingly; the binary counter switches to the opposite state. The binary counter 16 will remain in the opposite state until another negative pulse of the wave form 14b coincides with the wave form 13a being in a low voltage state.

This operation results in the wave form 16a being produced on the line 32. This wave form is 120° delayed phase from the wave form produced on the lead 30 and constitutes the second phase of the three phase power supply.

In a similar manner, the binary counter 17 produces an output wave form on the lead 33 which is delayed 240° in phase from the wave form produced on lead 30 and constitutes the third phase of the power supply. The 240° delay is produced by gating the triggering pulses from the binary counter 14 with the wave form 13b instead of the wave form 13a. However, in order for the binary counter 17 to operate properly, the wave form 14b from the binary counter 14 must be delayed slightly before being applied to the binary counter 17. This can be accomplished by connecting a proper size capacitor between the line carrying the wave form 14b and ground. The pulses 42 and 45 are the triggering pulses which coincide with the low voltage part of the wave form 13b and thereby trigger the flip-flop of the counter 17 to change its state thus resulting in the wave form 17a, which is delayed 240° in phase from the wave form produced by the binary counter 15. By slightly delaying the wave form 14b, the pulses 43 and 46 are made to occur during the high part of the wave form 13b rather than in the low part and therefore, they do not cause the binary counter 17 to change its state.

Figure 2:
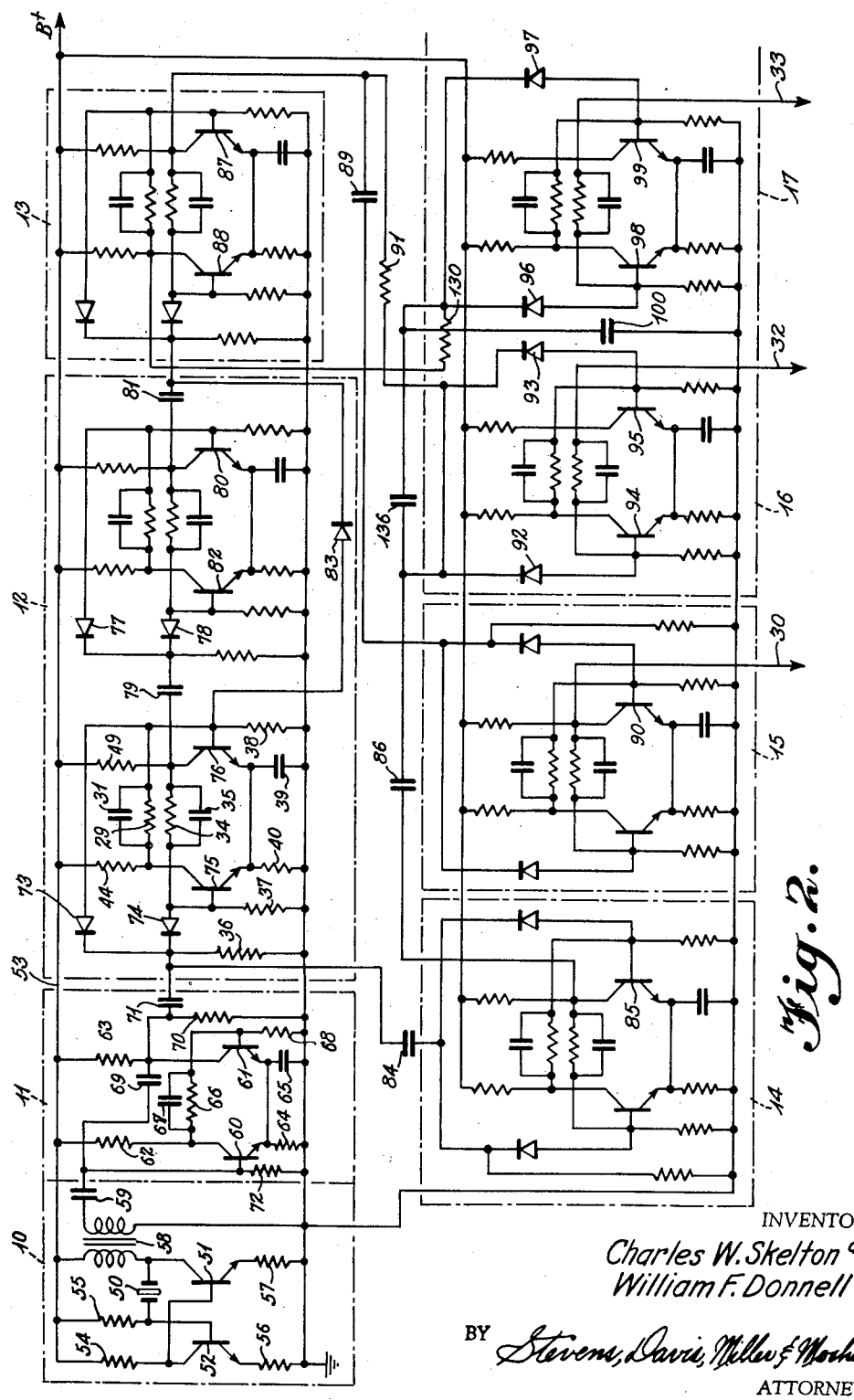
Figure 2 shows in detail the circuitry in the system of the block diagram shown in Figure 1.

Referring now to Figure 2, in which circuitry of the system of Figure 1 is shown in detail. The oscillator 10 comprises two transistors 51 and 52 and a crystal 50. Power is applied to the transistor 52 from the D.C. power supply on line 53 through the resistor 54. The base of this transistor is connected to line 53 by means of resistor 55. The collector of the transistor 51 is connected to the power supply on line 53 through the primary of the transformer 58. The emitter of the transistors 51 and 52 are connected to ground respectively through resistors 57 and 56. The collector of the transistor 52 drives the base of the transistor 51 by a direct connection. The collector of the transistor 51 drives the base of the transistor 52 through the crystal 50. This connection provides a positive feedback loop which is unstable and results in an oscillation of the circuit. The frequency of oscillation is controlled by the resonance of the crystal 50, which maintains the frequency precisely at 4800 cycles per second. The oscillation of the circuit results in an alternating voltage appearing across the primary winding of the transformer 58 and this oscillating signal is applied to the pulse former 11 through the capacitor 59. The pulse former comprises two transistors 60 and 61, whose collectors are energized from the D.C. power source on line 53 through the resistors 62 and 63, respectively. The emitters of the transistors 60 and 61 are connected to ground through the parallel circuit of the resistor 64 and capacitor 65. The collector of the transistor 60 is connected to the base of the transistor 61 by means of a parallel circuit of the resistor 66 and capacitor 67. The base of the transistor 61 is connected to ground through the resistor 68. The collector of the transistor 61 is connected to ground through the resistor 70 and to the base of the transistor 60 through the capacitor 69. The base of transistor 60 is connected to ground through the resistor 72. The signal output from the oscillator 10 is applied to the base of the transistor 60. When the voltage from the oscillator 10 applied to the base of the transistor 60 rises, current starts to flow in this transistor. As a result, the potential of the collector begins to drop and this drop is transmitted to the base of the transistor 61 by the parallel circuit of the capacitor 67 and the resistor 66. The current flowing through the transistor 61 thus decreases and the potential of the collector of this transistor rises. This rising voltage is transmitted to the base of the transistor 60 through the capacitor 69 thus augmenting the current flow through this transistor and causing collector potential to fall steeply. When the alternating voltage applied to the base of the transistor 60 begins to fall, the conduction in the transistor 60 starts to decrease and this decrease will cause a rise in the voltage potential of the collector of this transistor. This rise in potential is transmitted to the base of the transistor 61 through the parallel circuit of the capacitor 67 and the resistor 66 thus causing the transistor 61 to start conducting, which will in turn cause a drop in the potential of the collector of the transistor 61, which is transmitted again back to the base of the transistor 60 driving the transistor 60 more quickly into a cut-off region. In this manner, the transistors 60 and 61 are quickly driven into full on and full off conditions with the changes in the alternating voltage and a square wave voltage will be developed at the collector of transistor 61. This square wave voltage is the voltage 11a in Figure 4. When the square wave voltage produced at the collector is passed through the capacitor 71, it is differentiated and the resulting wave form is a series of positive and negative spikes shown in Figure 4 as the wave form 11b. This series of positive and negative spikes is applied to the ternary divider 12. The ternary divider 12 consists of two bistable multivibrators or flip-flops. Each flip-flop comprises a first and a second transistor. In one stable state the first transistor will conduct and the second transistor will be nonconducting and in the other stable state the first transistor will be nonconducting and the second transistor will conduct.

The first flip-flop of the ternary divider comprises two transistors 75 and 76. The input is connected to the bases of both these transistors respectively through rectifiers 74 and 73. The collectors of the two transistors are connected to the D.C. supply on line 53 respectively through resistors 44 and 49. The emitters are connected together and to ground through the parallel circuit of the capacitor 39 and the resistor 40. The bases are connected to ground respectively through resistors 37 and 38. The input to the two rectifiers 73 and 74 is connected to ground through the resistor 36. The collector of the transistor 76 drives the base of the transistor 75 through the parallel circuit of the resistor 34 and the capacitor 35. The collector of the transistor 75 drives the base of the transistor 76 through the parallel circuit of the resistor 29 and the capacitor 31. The positive pulses of the wave form 11a are not passed by the rectifiers 73 and 74 so that only the negative going pulses are applied to the bases of the transistors 75 and 76.

For purposes of explanation assume that the flip-flop comprising transistors 75 and 76 is in such a state that the transistor 75 is nonconductive and transistor 76 is conducting. A negative pulse from the wave form 11b is passed to the bases of the transistors 75 and 76. Since the transistor 75 is already nonconducting, the negative pulse on its base will have no effect. The transistor 76, however, is conducting and the negative pulse on its base has the effect of decreasing the current flow through the transistor and the voltage of the collector rises. This rise in voltage is impressed on the base of the transistor 75, which therefore begins to conduct, and the collector potential of this transistor decreases. This decrease is passed to the base of the transistor 76, causing a still further decrease in the current flow. This action is cumulative so that the collector potential of the transistor 76 rises steeply and that of the transistor 75 falls steeply. If the flip-flop starts out in the opposite state from which the transistor 75 is conducting and the transistor 76 is nonconducting, then a negative input pulse will cause a switching in the opposite direction so that the transistor 75 stops conducting and the transistor 76 starts conducting. Each time one of these negative pulses is applied to the bases of the transistors 75 and 76, the transistor which formerly was conducting is cut off and stops conducting while the other transistor starts conducting, thus switching the flip-flop from one state to the other. A square wave is thereby generated at the collector of the transistor 76 which is differentiated by the capacitor 79 and applied to the rectifiers 77 and 78. The rectifiers 77 and 78 pass only the negative pulses to the bases of the transistors 79 and 80. These transistors comprise a second flip-flop circuit which operates just like the one above described. Upon each application of the negative pulse to the bases of the transistor 79 and 80 the transistor which was conducting stops conducting and the transistor which was not conducting starts conducting, resulting in a square wave form (shown as 12a in Figure 4) being generated at the collector of the transistor 80. This square wave form is differentiated by the capacitor 81 and the resulting wave form is shown as 12b in Figure 4.

The sequence of operation of the ternary divider 12 will now be described. It will be assumed that the ternary divider starts out with the two flip-flops in such a state that the transistors 76 and 80 are conducting and transistors 82 and 75 are not conducting. When the first negative pulse from the pulse shaper 11 is applied to the ternary divider, the transistor 76 stops conducting, the transistor 75 starts conducting, and the voltage level of the collector of the transistor 76 goes to its high voltage level. This action causes a positive spike to be produced by the capacitor 79 which has no effect on the flip-flop comprising the transistors 80 and 82. When the second negative pulse from the pulse shaper is applied to the ternary divider, it causes the transistor 75 to stop conducting and the transistor 76 to start conducting. This operation results in a negative pulse being differentiated by the capacitor 79 and applied to the bases of the transistors 82 and 80. The transistor 80 then stops conducting and the collector of this transistor goes to its high voltage level while the transistor 82 starts to conduct. The third negative pulse from the pulse former again causes the transistor 76 to stop conducting and the transistor 75 to start conducting and a positive pulse is differentiated by the capacitor 79. The fourth negative pulse repeats the operation of causing the transistor 76 to start conducting and the transistor 75 to stop conducting resulting in a negative pulse being differentiated by the capacitor 79. This pulse causes the transistor 82 to stop conducting and the transistor 80 goes into the conducting state. This causes a change in the potential level in the collector of the transistor 80 from a high voltage level to a low voltage level resulting in a negative spike being differentiated by the capacitor 81. The negative spike is passed by the rectifier 83 to the base of the transistor 76 thereby causing this transistor to stop conducting and resulting in a change of the state of this flip-flop so that the transistor 76 again stops conducting. The fifth negative pulse from the pulse former will then again cause the transistor 76 to start conducting and a negative pulse will again be generated and applied to the transistor 80 which will then again return to its nonconducting state. The sixth negative pulse from the pulse former 11 will again cause a change of state in the flip-flop comprising transistors 75 and 76 whereby the transistor 76 is switched to a nonconducting state. The seventh negative pulse from the pulse former 11 will then switch the transistor 76 to a nonconducting state which will cause a negative pulse to be differentiated by the capacitor 79 and cause a change of state in the flip-flop comprising transistors 80 and 82. The operation will continue in this manner with a negative pulse being differentiated by the capacitor 81 once for every three negative pulses applied to the ternary divider 12 from the pulse former 11.

The output from the pulse former 11 also is applied to the binary counter 14 through the isolating capacitor 84. The binary counter 14 comprises a flip-flop circuit which is just like the fully described flip-flop of the ternary divider. Upon each application of a negative pulse from the pulse former 53, the flip-flop of the binary counter 14 changes its state and produces at the collector of the transistor 85 a square wave form at one-half the frequency of the output produced by the pulse former 11. This square wave form is shown as 14a in Figure 4 and is differentiated by the capacitor 86 which results in the wave form 14b being generated. This wave form is used to trigger two of the output binary counters 16 and 17. The three output binary counters 15–17 each comprise a flip-flop circuit which is just like the fully described flip-flop circuit of the ternary divider except that no capacitor is provided to differentiate the output signals which are taken from the collectors of the transistors 90, 95 and 99.

Figure 4:
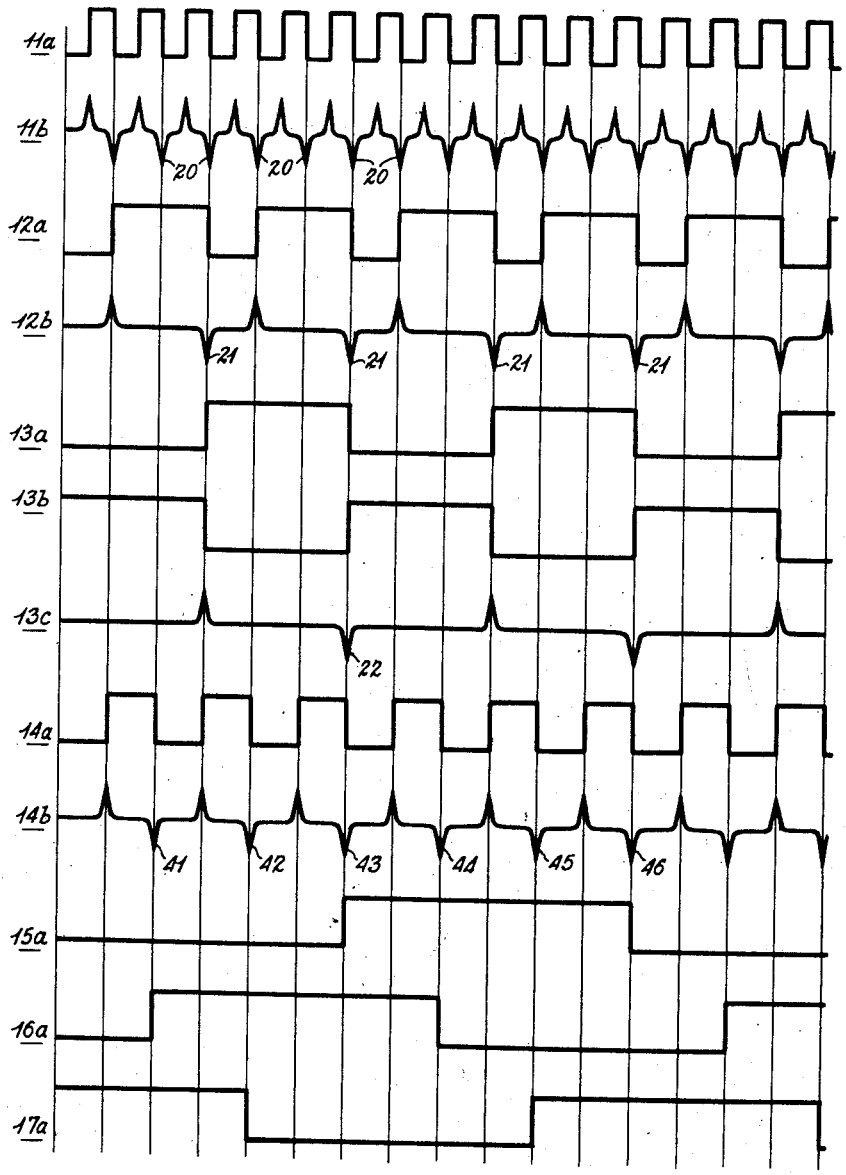
Figure 4 shows some wave forms produced by the system of Figures 1 and 2.

The wave form produced at the collector of the transistor 80 of the ternary divider is shown as 12a in Figure 4. After differentiation by the capacitor 81, this wave form becomes a series of positive and negative spikes and is shown in Figure 4 as wave form 12b. The wave form 12b is applied to the binary counter 13. The binary counter 13 comprises a transistor flip-flop just like the flip-flop of the ternary divider described in detail and changes state on receipt of each negative pulse. It generates at the collector of the transistor 87 a square wave form of a frequency of one-half of the output frequency of the ternary divider. This square wave form is shown in Figure 4 as wave form 13a. Also, there is an additional wave form 13b generated at the collector of the transistor 88 at the same frequency but 180° out of phase with the wave form generated at the collector of the transistor 87. The collectors of the transistors 87 and 88 are connected to the input rectifiers 92 and 93 and 96 and 97 of the respective binary counters 16 and 17 over resistors 91 and 130. The wave form 13a generated at the collector of the transistor 87 is differentiated by the capacitor 89 and applied to the binary counter 15. This differentiated wave form is shown as 13c in Figure 4 and consists of a series of negative and positive pulses. The flip-flop of the binary counter 15 changes its state at a rate of one-half the frequency of the applied wave form and as a result a 400 cycle per second wave form 15a is generated at the collector of the transistor 90. The wave form generated at this collector appears on the output lead 30 from the binary counter and constitutes the first phase of the power output.

The binary counter 16 generates the wave form 16a at the collector of the transistor 95. This wave form is applied to the output lead 32 and constitutes the second phase of the three phase power supply. This wave form is generated as a result of the flip-flop of the binary counter 16 changing state when actuated or triggered by one of the negative pulses of the wave form 14b being applied to the bases of the transistors 94 and 95. However, only every third one of these negative pulses is able to be applied to the bases of the transistors because of the reverse bias of the wave form 13a applied to the rectifiers 92 and 93. Whenever the voltage wave form 13a is at a high potential, it blocks these rectifiers 92 and 93 so that the negative pulses cannot pass to the transistors 94 and 95 of the binary counter 16. However, when the wave form 13a is in its low voltage state, the negative pulses are allowed to pass to the bases of the transistors 94 and 95 and thus cause a change of state of the flip-flop. In exactly the same manner, the rectifiers 96 and 97 of the binary counter 17 are blocked by the wave form 13b when it is at its high potential. When the wave form 13b is at its low potential, the negative pulses are passed by the rectifiers 96 and 97 to the transistors 98 and 99 and thus cause a change of state of the flip-flop circuit. The capacitor 136 blocks the bias potential applied to the counter 17 from being applied to the counter 16 and vice versa. The capacitor 100 delays the wave form produced by the capacitor 86 a slight instant so that only one pulse in three will be passed by the rectifiers 96 and 97 to cause a change of state of the flip-flop of binary counter 17. The binary counter 16 thereby produces an output wave form 120° delayed in phase from the output wave form on the lead 30 while the binary counter 17 produces on the lead 33 and output wave form 240° delayed in phase. The three wave forms together combine to give a three phase power supply each phase of which is accurately located in the proper phaseal relationship.

Figure 3:
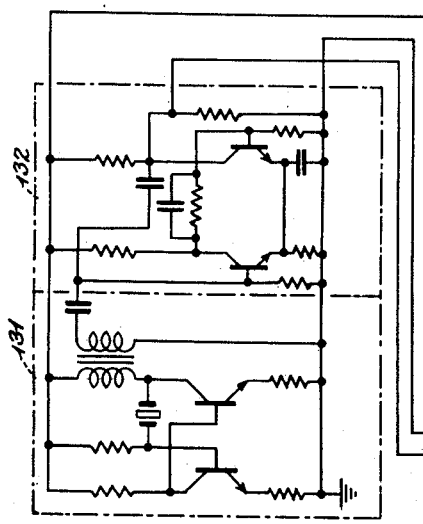
Figure 3 shows a second embodiment of the invention.

Referring now to Figure 3, an improved embodiment of the phase splitter power supply is shown. The oscillator 131 and the pulse former 132 are the same as in the embodiment above described except that the crystal is chosen to resonate at 2400 cycles per second. The oscillator and pulse former accordingly generate frequencies of 2400 cycles per second. The square wave voltage produced by the pulse former is applied over line 101 to three flip-flops 120, 121, 122. The three flip-flops employ the same transistor circuit, comprising respectively transistors 114 and 115, 116 and 117, and 118 and 119, as was fully described with reference to the flip-flop in the ternary divider. The output from the pulse former actuates each of the three flip-flops in succession to change its state so that the output from each of the flip-flops is at ⅙ the frequency of the input and the three outputs are 120° displaced from each other. Each preceding flip-flop gates the triggering pulse from the pulse former to the succeeding flip-flop; that is, the triggering pulse to the flip-flop 121 is gated by a signal from the flip-flop 120, the triggering pulse from the pulse former to the flip-flop 122 is gated by a signal from the flip-flop 121 and the triggering pulse from the pulse former to the flip-flop 120 is gated by a signal from the flip-flop 122. The gating circuit is designed so that the succeeding flip-flop cannot be actuated to change its state if the preceding flip-flop is in the opposite state than the succeeding flip-flop. For example, a triggering pulse will not actuate the flip-flop 121 if the flip-flop 122 is not in the same state as the flip-flop 121.

Figure 5:
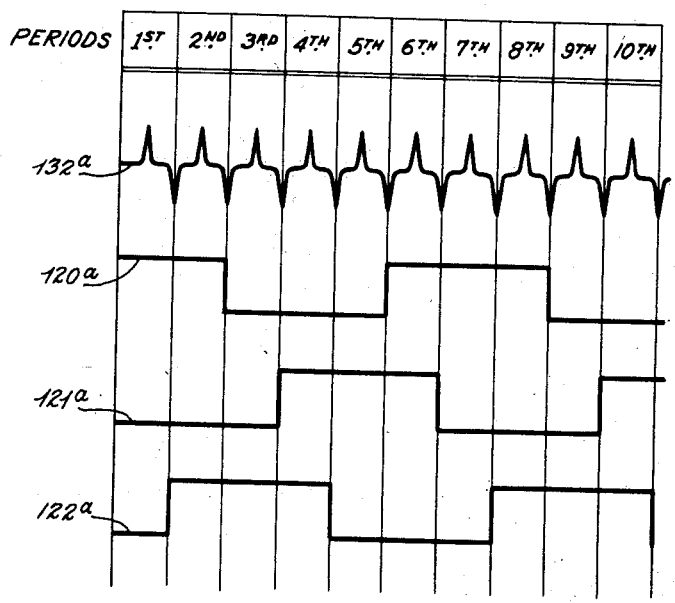
Figure 5 shows some wave forms produced by the system shown in Figure 3.

The square wave signal on lead 101 on being applied to the flip-flop circuit 120 is first differentiated by the two capacitors 102 and 103. The resulting wave form produced by these capacitors is shown in Figure 5 as 132a. The capacitors 102 and 103 are connected respectively to rectifiers 108 and 109, which only allow negative pulses from the differentiated wave form to be passed to the bases of transistors 114 and 115. When a negative pulse is applied to the base of the conducting transistor, the flip-flop 120 will change its state in the same manner as was explained with reference to the fully described flip-flop of the ternary divider.

The flip-flops 121 and 122 are connected to the line 101 and are actuated by the square wave signal thereon in the same manner as the flip-flop 120 by means of the rectifiers 110 and 111 and capacitors 104 and 105 for the flip-flop 121, and the rectifiers 112 and 113 and the capacitors 106 and 107 for the flip-flop 122.

The gating of the triggering pulses to actuate the flip-flops 120 through 122 is done by the following circuitry. The inputs to each of the rectifiers 108 through 113 are each connected to the collectors of one of the transistors 114 through 119 through a resistor. The point between the rectifier 108 and the capacitor 102 is connected to the collector of the transistor 118. The point between the capacitor 103 and the rectifier 109 is connected to the collector of the transistor 119. The point between the capacitor 104 and the rectifier 110 is connected to the collector of the transistor 114. The point between the capacitor 105 and the rectifier 111 is connected to the collector of the transistor 115. The point between the capacitor 106 and the rectifier 112 is connected to the collector of the transistor 116 and the point between the capacitor 107 and the rectifier 113 is connected to the collector of the transistor 117. The rectifiers 108 through 113 pass or do not pass the negative pulses differentiated by their respective connected capacitors 102 through 107 depending upon the bias that these rectifiers receive at their inputs from the collectors of the transistors to which they are connected. For example, the rectifier 108 will pass a negative pulse to the base of the transistor 114 only if the collector of the transistor 118 is at a low potential. If the collector of the transistor 118 is at a high potential, the rectifier 108 is biased in a reverse direction and the negative pulse differentiated by the capacitor 102 will not be passed by the rectifier. If, however, the collector of the transistor 118 is at a low potential, then the negative pulse applied to the rectifier 108 by the capacitor 102 will be passed by the rectifier to the base of the transistor 114. Likewise, the rectifiers 109 through 113 will only pass negative pulses differentiated by their respective capacitors when they are properly biased by the collector of the transistors to which they are connected. In other words, each of the rectifiers 108 through 113 is gated by the collector potential of one of the transistors 114 through 119. This gating operation results in there being generated three wave forms on the lines 123 through 125. The wave forms on lines 124 and 125 are delayed in phase from the wave form generated on lead 123 by 120° and 240°, respectively. These wave forms on the leads 123–125 are shown respectively as wave forms 120a through 122a in Figure 5.

For full understanding of how the system operates, a cycle of operation will be described. It will be assumed that the flip-flop 120 is in a state in which the transistor 115 is not conducting and the transistor 114 is conducting. It will be further assumed that the flip-flops 121 and 122 are in the opposite state so that the transistors 117 and 119 are conducting and the transistors 116 and 118 are not conducting. Under these conditions, the output on lead 123 will be a high voltage and the outputs on leads 124 and 125 will be a low voltage. The time during the example of operation shall be divided into periods. The first period will be the interval before the first negative pulse is differentiated from the square wave output on line 101. The second period will be the interval preceding the second negative pulse differentiated, the third period will precede the third negative pulse differentiated, et cetera. Referring now to Figure 5, the periods are shown. The negative pulses of the wave form 132a mark the boundaries of the periods as this wave form is produced by differentiating the square wave on lead 101. The wave form 120a is generated by the flip-flop 120 and applied to lead 123. The high voltage level of this wave form during the first period corresponds to the assumed initial state in which the transistor 115 is not conducting and the transistor 114 conducts. The wave forms 121a and 122a are generated by flip-flops 121 and 122 and are applied to leads 124 and 125, respectively. The low voltage level of these wave forms during the first period corresponds to the initial assumed state in which the transistors 117 and 119 are conducting and the transistors 116 and 118 are not conducting. Under these conditions, the rectifiers 108 and 111 will be reverse biased with a high voltage from the collectors of transistors 118 and 115, respectively so as to prevent the first negative pulse from being passed by the rectifiers to the bases of the transistors 114 and 117. The only conducting transistor then which will receive a negative pulse will be transistor 119. This will cause the flip-flop 122 to switch over to the opposite state. Therefore, the wave form 122a will change to be a high voltage in the second period, while the wave form 120a remains high and the wave form 121a remains low. When the second negative pulse is received, the conducting transistors will be those numbered 114 and 117 and 118. The transistors 117 and 118 will not receive the second negative pulse because the rectifiers 111 and 112 are both biased in a reverse direction with a high voltage from the collectors of transistors 115 and 116, respectively. The transistor 114 will receive a negative pulse as the bias applied to the rectifier 108 is a low voltage. This will cause the flip-flop 120 to change its state while the flip-flops 121 and 122 remain in the state in which they were. As a result, the wave form 120a changes to be a low voltage in the third period, while the wave form 121a remains low and the wave form 122a remains high. At the end of the third period, the transistors 115, 117 and 118 will be conducting. When the third negative pulse is applied to the rectifiers, the rectifiers 109 and 112 will be blocked by the high reverse biasing voltage while the rectifier 111 passes the negative pulse to the base of transistor 117 and consequently, the flip-flop 121 will change over to the opposite state. Accordingly, the wave form 120a remains at a low potential and the wave form 122a remains at a high potential, while the wave form 121a on the lead 124 changes to be high potential in the fourth period. In a similar manner, it can be seen that at the end of the fourth period, the wave form 122a will change from a high voltage to a low voltage while the wave forms 120a and 121a on leads 123 and 124 will remain the same. By following this reasoning, it can be seen that the wave forms 120a through 122a are continuously reproduced as the negative pulses are applied to the rectifiers 108 through 113. The resulting wave forms 120a through 122a are at a frequency of 400 cycles per second and are displaced each from the other by 120° so that a three phase output power supply is obtained on the leads 123 through 125.

The three flip-flops 120, 121 and 122 connected in this manner are actuated in sequence by the triggering pulses from the pulse former 132 and actually comprise a three stage ring connected shift register. It will be obvious to those skilled in the art as to how the shift register could be extended to include additional stages.

The stable state which the flip-flops 120 through 122 assume when they are first energized is a matter of chance and it is possible that all these flip-flops would start out in the same state. With such an initial condition, the flip-flops would not generate a three phase output but would all continuously change states back and forth generating an output at one-half the input frequency and the three output wave forms would all be in phase with one another. To prevent such malfunctioning of the circuit three rectifiers, 126 through 128 are connected respectively to the three output leads 123 through 125. The other terminals of the three rectifiers 126 through 128 are connected together and to the base of a transistor 129. The base of the transistor 129 is also connected to the source of D.C. power through a resistor 140. The collector of the transistor is connected directly to the D.C. source of power on line 142 and the emitter is connected to ground through resistor 141. With the transistor connected in this manner, the emitter voltage will follow the base voltage. An output is taken from the emitter through the rectifier 143 and applied to the connection between the rectifier 108 and the capacitor 102.

If the circuit is operating properly, at least one of the output leads 123 through 125 will be at a low potential and the potential applied at the base of the transistor 129 will also remain low. The emitter voltage of the transistor 129 accordingly will remain at a low potential and there will be no effect on the operation of the circuit. If it should happen that the three flip-flops should set up at the start of operation so that they are all in the same state, thus preventing the proper operation of the system, then all three of the leads 123 through 125 will go to a high potential at the same time. This will cause a high potential to be applied to the base of the transistor 129 and thus a high potential will be produced from the emitter of this transistor. This action will result in a high potential being applied to the input of the rectifier 108, and when the next negative pulse is differentiated by the capacitor 102, the rectifier 108 will not pass the negative pulse and the flip-flop 120 will not change its state, while the other two flip-flops 121 and 122 will change their state. The outputs from the flip-flops 121 and 122 will then be a low potential while the output from the flip-flop 123 will remain a high potential. Thus, the three flip-flops will be in the state equivalent to that described in the first period in the example of the operation and the circuit will then continue to give a three phase output as described above.

This invention has been described using n-p-n transistors. However, p-n-p transistors could be used with obvious design modifications. These and other modifications are considered to come within the scope of this invention which is to be limited only as defined in the appended claims.

What is claimed is:

1. A system for generating three phase alternating current comprising means to produce a series of pulses, a first, second and third flip-flop, each of said flip-flops producing in response to said series of pulses an output voltage having two values occurring alternately for substantially equal periods of time and means to gate said series of pulses to flip-flops so that said second flip-flop produces an output voltage displaced 120° in phase from the output voltage produced by said first flip-flop and the output voltage produced by said third flip-flop is displaced 120° in phase from the outputs produced by said first and said second flip-flops.

2. A system as recited in claim 1 wherein said flip-flops comprise transistor circuits.

3. A system as recited in claim 1 wherein said means to produce a series of pulses generates said pulses at a constant frequency.

4. A power supply system comprising means to produce a series of pulses, a plurality of flip-flop means, and means to apply each of said pulses to all of said flip-flop means simultaneously, said plurality of flip-flop means being responsive to the pulses applied thereto to produce a three phase output voltage in synchronism with said pulses, each phase of said output voltage having two values occurring alternately for substantially equal periods of time.

5. A power supply system as recited in claim 4 wherein said plurality flip-flop means comprises a plurality of bistable transistor multivibrators.

6. A system as recited in claim 4 wherein said means to produce a series of pulses generates said pulses at a constant frequency.

7. A three phase power supply comprising a first bistable means, a second bistable means and a third bistable means, each of said bistable means having a first stable state and a second stable state and producing one output potential when in said first stable state and a second output potential when in said second stable state, trigger means feeding pulses to said first, second and third bistable means simultaneously to switch each of said bistable means to cause each of said bistable means to switch from the state that it is in to the opposite state, means to prevent said trigger means from switching said second bistable means from said first state to said second state whenever said first bistable means is in said second state, means to prevent said trigger means from switching said second bistable means from said second state to said first state whenever said first bistable means is in said first stable state, means to prevent said trigger means from switching said third bistable means from said second state to said first state whenever said second bistable means is in said first state, means to prevent said trigger means from switching said third bistable means from said first stable state to said second stable state whenever said second bistable means is in said second stable state, means to prevent said trigger means from switching said first bistable means from said second stable state to said first stable state whenever said third bistable means is in said first stable state, and means to prevent said trigger means from switching said first bistable means from said first stable state to said second stable state whenever said third bistable means is in said second bistable state.

8. A power supply as recited in claim 7 wherein said trigger means comprises a source of constant frequency pulses.

9. A power supply as recited in claim 7 wherein means is provided to prevent said trigger means from switching said first bistable means from said first stable state to said second stable state whenever all three of said bistable means are in said first stable state.

10. A power supply recited in claim 7 wherein said bistable means comprise transistor flip-flop circuits.

11. A shift register comprising a chain of flip-flop circuits having a first and a second stable state, a first plurality of rectifiers one connected to each flip-flop so that when a pulse is passed through one of said rectifiers the flip-flop connected thereto will switch from said first stable state to said second stable state, a second plurality of rectifiers one connected to each flip-flop so that when a pulse is passed through one of said second rectifiers the flip-flop connected thereto will switch from said second state to said first state, means to pass pulses to all of said rectifiers simultaneously, means to bias the first rectifier of each preceding flip-flop circuit so that pulses can't be passed thereby in response to the immediately succeeding flip-flop being in said second stable state, and means to bias the second rectifier of each preceding flip-flop circuit so that pulses can't be passed thereby in response to the immediately succeeding flip-flop circuit being in said first stable state.

12. A shift register as recited in claim 11 wherein there are at least three flip-flop circuits in said chain of flip-flop circuits.

13. A shift register as recited in claim 11 wherein the active elements in said flip-flop circuits comprise transistors.

14. A three phase power supply comprising a first, second and third bistable means, each of said bistable means adapted to produce a first potential output when in said first stable state and a second potential output when in a second stable state, and triggering means to apply trigger pulses to said first, second and third bistable means simultaneously to cyclically actuate said bistable means to change from the state that it is in to the other state in sequence thereby producing a three phase output voltage, each phase of which has two values occurring alternately for substantially equal periods of time.

15. A power supply as recited in claim 14 wherein said bistable means comprise transistor flip-flop circuits.

16. A power supply as recited in claim 14 wherein said means to cyclically actuate said bistable means actuates them at a constant rate.

References Cited in the file of this patent

UNITED STATES PATENTS

| Re. 24,053 | Morris | Aug. 23, 1955 |
| 2,406,760 | Goldmark | Sept. 3, 1946 |
| 2,620,440 | Baker et al. | Dec. 2, 1952 |
| 2,723,354 | Isborn | Nov. 8, 1955 |
| 2,783,384 | Bright et al. | Feb. 26, 1957 |

FOREIGN PATENTS

| 703,192 | Great Britain | Jan. 27, 1954 |